(12) United States Patent
Nonaka et al.

(10) Patent No.: US 7,679,734 B2
(45) Date of Patent: Mar. 16, 2010

(54) CURVED SURFACE SHAPE INSPECTION METHOD, FIBER OPTICAL BLOCK, AND CURVED SURFACE SHAPE INSPECTION DEVICE

(75) Inventors: Katsutoshi Nonaka, Hamamatsu (JP); Takeo Sugawara, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 491 days.

(21) Appl. No.: 10/586,327

(22) PCT Filed: Dec. 27, 2004

(86) PCT No.: PCT/JP2004/019537
§ 371 (c)(1),
(2), (4) Date: May 3, 2007

(87) PCT Pub. No.: WO2005/068935
PCT Pub. Date: Jul. 28, 2005

(65) Prior Publication Data
US 2007/0216911 A1     Sep. 20, 2007

(30) Foreign Application Priority Data
Jan. 16, 2004   (JP) .............................. 2004-009698

(51) Int. Cl.
*G01N 21/00* (2006.01)
*G02B 6/04* (2006.01)
(52) U.S. Cl. .................... 356/237.2; 356/601; 385/120; 385/121

(58) Field of Classification Search ............. 356/71–72, 356/237.1–237.3, 600–601; 385/120, 121, 385/117, 118, 119, 155, 116, 901; 382/124–127; 324/752, 754
See application file for complete search history.

(56) References Cited

U.S. PATENT DOCUMENTS

| 3,906,520 | A | * | 9/1975 | Phillips ..................... 396/15 |
| 4,133,353 | A | * | 1/1979 | Larmit ..................... 139/435.1 |
| 4,785,171 | A | * | 11/1988 | Dowling et al. ......... 250/227.28 |
| 4,911,528 | A | * | 3/1990 | Polaert ..................... 385/116 |
| 5,426,296 | A | * | 6/1995 | Shikai et al. ............. 250/227.2 |

(Continued)

FOREIGN PATENT DOCUMENTS

JP          61-17365        5/1986

(Continued)

*Primary Examiner*—Sang Nguyen
(74) *Attorney, Agent, or Firm*—Drinker Biddle & Reath LLP

(57) ABSTRACT

In a fiber optic block 10 formed by bundling and integrating a plurality of optical fibers 11 each composed of a core region 12 and a clad region 13, an at least partially curved input end face 14 composed of one end of each optical fiber and a measurement surface having a curved surface shape of a to-be-measured object are pressed against each other. Then, an optical image formed by bringing the input end face into contact with the measurement surface and output from an output end face 15 of the fiber optic block is used to inspect the curved surface shape of the to-be-measured object. This allows a curved surface shape inspection method capable of inspecting the shape of a curved surface easily, a fiber optic block, and a curved surface shape inspection apparatus to be achieved.

19 Claims, 15 Drawing Sheets

U.S. PATENT DOCUMENTS

| | | | | |
|---|---|---|---|---|
| 5,684,906 | A * | 11/1997 | Sugawara | 385/120 |
| 5,764,823 | A * | 6/1998 | Shapanus et al. | 385/19 |
| 5,808,729 | A * | 9/1998 | Sugawara et al. | 356/71 |
| 5,940,565 | A * | 8/1999 | Sugawara | 385/115 |
| 6,885,203 | B1 * | 4/2005 | Woodberry | 324/754 |
| 7,448,991 | B2 * | 11/2008 | Lanier et al. | 493/40 |

FOREIGN PATENT DOCUMENTS

| | | |
|---|---|---|
| JP | 4-194703 | 7/1992 |
| JP | 5-99603 | 4/1993 |
| JP | 8-285506 | 11/1996 |

* cited by examiner

Fig.4
(a)
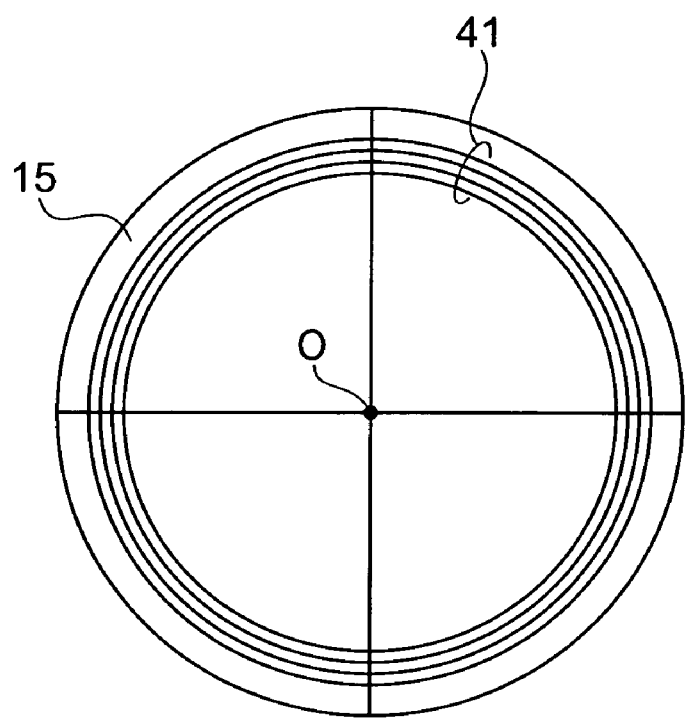
(b)
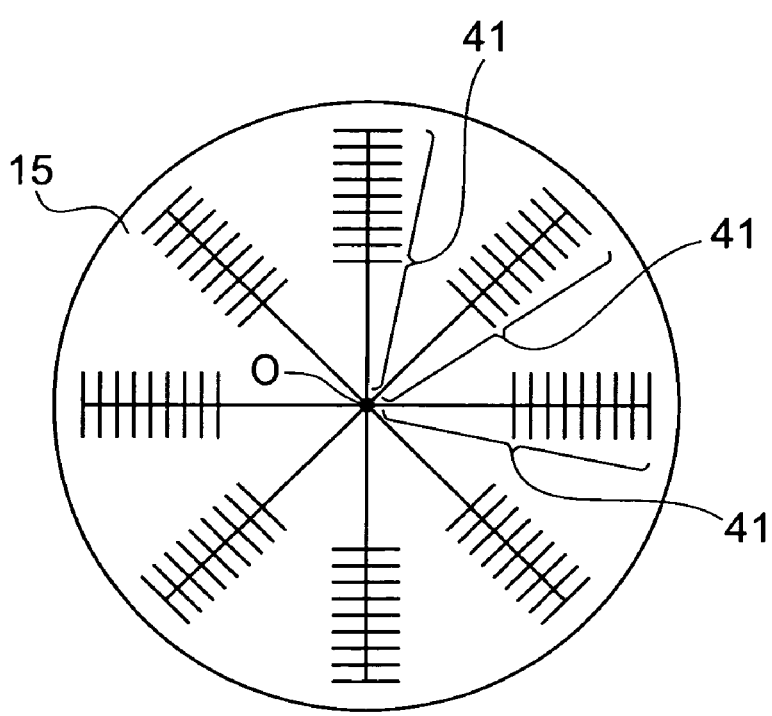

Fig.7
(a)
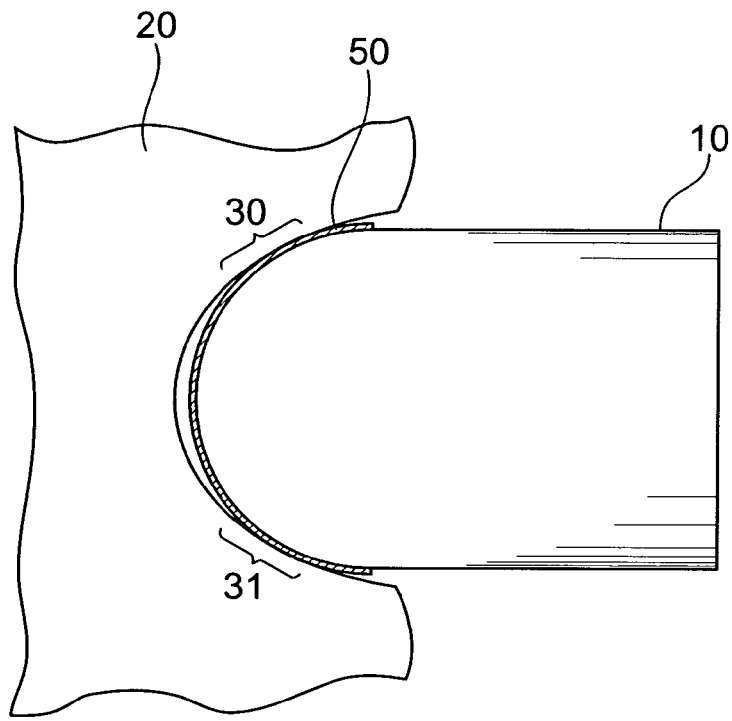
(b)
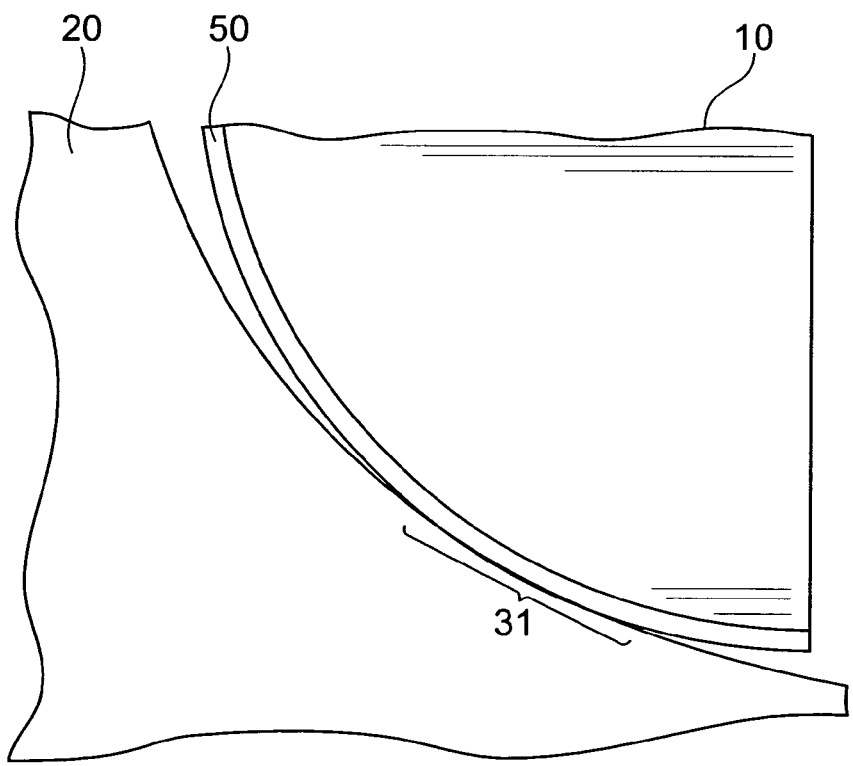

Fig.14
(a)
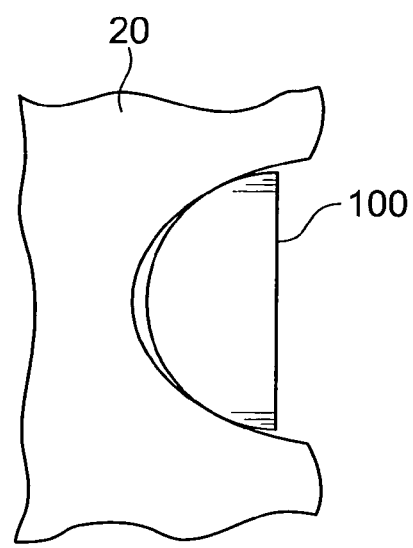
(b)
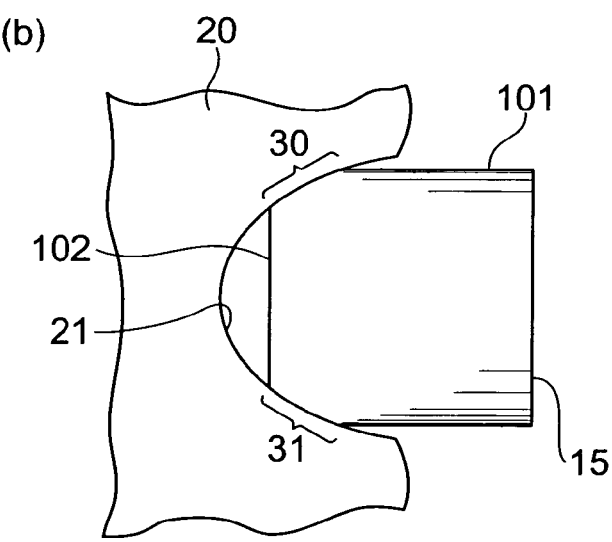
(c)
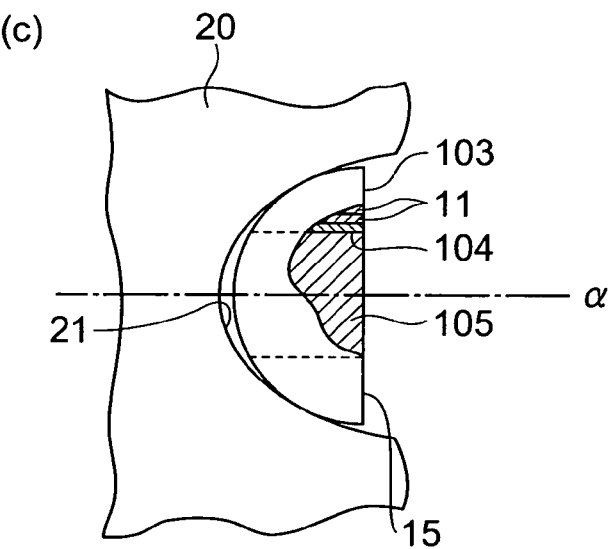

CURVED SURFACE SHAPE INSPECTION METHOD, FIBER OPTICAL BLOCK, AND CURVED SURFACE SHAPE INSPECTION DEVICE

TECHNICAL FIELD

The present invention relates to a curved surface shape inspection method, fiber optic block, and curved surface shape inspection apparatus.

BACKGROUND ART

The shape of grooves in constant-velocity joints used in automobiles is measured, for example, as follows. A mixture of fine powder and liquid is first applied to a surface to be measured. Then, a spherical body having specified dimensions is pressed against the measurement surface, and a line that is formed accordingly in the contact portion is measured using a caliper, etc. However, such a method requires a complicated operation, with a low accuracy in measuring the shape of grooves.

On the contrary, there are disclosed apparatuses for measuring the shape of a curved surface in Patent Documents 1 and 2. Methods of measuring the shape of a curved surface using the apparatuses described in Patent Documents 1 and 2 will hereinafter be described.

In the measuring apparatus described in Patent Document 1, a spherical portion having the same diameter as a ball to be rolled along a ball rolling groove and formed on a main shaft is first engaged with the ball rolling groove. Next, the main shaft is rotated about the shaft line thereof. Here, the movement of a contact that protrudes from the spherical portion and is in contact with the ball rolling groove is to be measured. This allows the shape of the ball rolling groove to be measured.

In the measuring apparatus described in Patent Document 2, a reference sphere is restrained between the curved surface of a work to be measured and the horizontal and vertical restraining surfaces of a restraining member. In this state, the distance between the reference position of the work and the horizontal restraining surface is measured. This measurement is to be carried out for three reference spheres having their respective different diameters. Then, the curvature radius of the curved surface of the work and the position of the curvature center are calculated geometrically using those measured values.

Patent Document 1: Japanese Utility Model Publication No. S61-17365

Patent Document 2: Japanese Patent Application Laid-Open No. H8-285506

DISCLOSURE OF THE INVENTION

Problems to be Solved by the Invention

However, the measuring apparatus described in Patent Document 1 is complicated and requires precise measurement, resulting in restricting the place where to use the apparatus. In addition, there must be an increased number of measurement points for accurate measurement of the shape of the curved surface. The measuring apparatus described in Patent Document 2 requires a plurality of reference spheres to be used, whereby it is necessary to measure the distance between the reference position of the work and the horizontal restraining surface for each reference sphere. Thus, the measuring apparatuses described in Patent Documents 1 and 2 also require complicated measuring operations.

It is an object of the present invention to provide a curved surface shape inspection method capable of inspecting the shape of a curved surface easily, a fiber optic block to be used in the inspection method, and a curved surface shape inspection apparatus to which the fiber optic block is applied.

Means for Solving the Problems

In order to solve the above-described problems, a curved surface shape inspection method according to the present invention is a method wherein in a fiber optic block formed by bundling and integrating a plurality of optical fibers each composed of a core region and a clad region surrounding the core region, an at least partially curved input end face composed of one end of each optical fiber and a measurement surface having a curved surface shape of a to-be-measured object are pressed against each other, and an optical image formed by bringing the input end face into contact with the measurement surface and output from an output end face of the fiber optic block that is positioned on the opposite side to the input end face is used to inspect the curved surface shape of the to-be-measured object.

In the method above, the input end face of the fiber optic block composed of the plurality of optical fibers and the curved measurement surface of the to-be-measured object are pressed against each other. Then, the optical image formed by bringing the input end face into contact with the measurement surface and output from the output end face of the fiber optic block is used to inspect the curved surface shape of the to-be-measured object.

The optical image is formed by bringing the input end face into contact with the measurement surface, corresponding to the contact pattern between the input end face and the measurement surface. Therefore, the curved surface shape of the to-be-measured object can be inspected by inspecting the optical image.

In the case above, since the curved surface shape of the to-be-measured object can be inspected only by pressing the fiber optic block against the to-be-measured object, the inspection can be carried out easily. In addition, no fine powder is used, resulting in an improvement in workability.

Also, a fiber optic block according to the present invention is adapted to be applied to an inspection of the curved surface shape of a to-be-measured object and is formed by bundling and integrating a plurality of optical fibers each composed of a core region and a clad region surrounding the core region, the fiber optic block including: an at least partially curved input end face composed of one end of each optical fiber; and an output end face positioned on the opposite side to the input end face and adapted to output an optical image to be formed by light entering the input end face.

In the thus arranged fiber optic block, light entering each optical fiber through the at least partially curved input end face is to be guided through each optical fiber. Then, an optical image to be formed by light that has propagated through each optical fiber is to be output from the output end face.

The curved surface shape of the to-be-measured object is inspected by pressing the input end face against the curved measurement surface of the to-be-measured object. In this case, the optical image corresponds to the contact pattern between the input end face and the measurement surface. Therefore, the curved surface shape of the to-be-measured object can be inspected by inspecting the optical image. Here, the inspection is to be carried out by, for example, comparing an optical image that has actually been output from the output end face with an optical image to be formed when the to-be-measured object has a desired curved surface shape.

In an inspection of the curved surface shape using the thus arranged fiber optic block, since the curved surface shape of the to-be-measured object can be inspected only by pressing the block against the to-be-measured object, the inspection can be carried out easily. In addition, no fine powder is used, resulting in an improvement in workability.

Further, a curved surface shape inspection apparatus according to the present invention is for inspecting the curved surface shape of a to-be-measured object, including: the fiber optic block as mentioned above; and imaging means provided in such a manner as to face the output end face of the fiber optic block and adapted to take an optical image output from the output end face.

In the arrangement above, the optical image output from the output end face of the fiber optic block according to the present invention is to be taken by the imaging means.

In an inspection of the curved surface shape of the to-be-measured object, an optical image to be formed when the curved measurement surface of the to-be-measured object and the input end face are pressed against each other corresponds to the contact pattern between the measurement surface and the input end face. Therefore, the curved surface shape of the to-be-measured object can be inspected using the optical image. Then, in the thus arranged curved surface shape inspection apparatus, since the optical image output from the output end face is taken by the imaging means, it is possible to carry out the inspection using the optical image displayed on a monitor, etc. Accordingly, the inspection can be carried out easily and automatically.

EFFECTS OF THE INVENTION

In accordance with the present invention, it is possible to provide a curved surface shape inspection method capable of inspecting the shape of a curved surface easily, a fiber optic block available in the curved surface shape inspection method, and a curved surface shape inspection apparatus using the fiber optic block.

BRIEF DESCRIPTION OF THE DRAWINGS

FIG. 4 is a front view of the output end face 15 with an inspection pattern 41 formed thereon.

FIG. 7 is an illustrative view of a curved surface shape inspection method according to a second embodiment.

FIG. 14 is a side view showing an exemplary variation of a fiber optic block.

DESCRIPTION OF THE SYMBOLS

Figure 1:
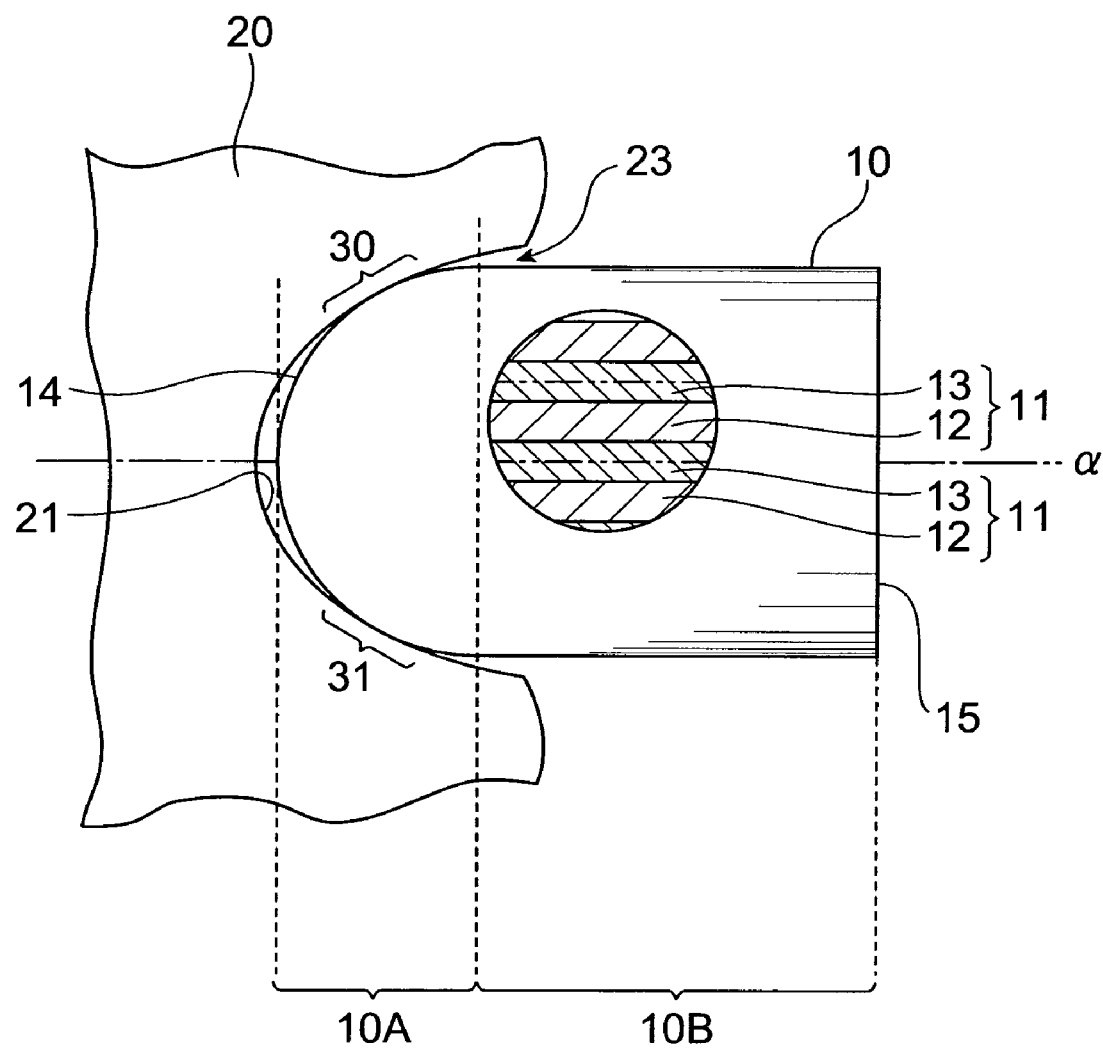
FIG. 1 is an illustrative view of a curved surface shape inspection method according to a first embodiment.

10—Fiber optic block, 12—Core region, 13—Clad region, 14—Input end face, 15—Output end face, 20—To-be-measured object, 21—Measurement surface, 30, 31—Contact portion, 32—Optical image, 33, 34—Contact portion image, 41—Inspection pattern, 42—Positioning pattern, 50—Film, 51—Luminescent liquid, 52—Scattering liquid, 60—Illuminating means, 70, 80, 90—Curved surface shape inspection apparatus, 71, 81—Imaging means, 72—Lens system, 91—Fiber optic block, 91B—Trunk portion (predetermined region including output end face), 92—Optical fiber, 92A, 92B—Optical fiber, 93A, 93B—Core region, 94A, 94B—Clad region, 95B—Light absorber.

BEST MODES FOR CARRYING OUT THE INVENTION

Preferred embodiments of the present invention will hereinafter be described in detail with reference to the accompanying drawings. It is noted that in the descriptions of the drawings, identical elements are designated by the same reference numerals to omit redundant description.

First Embodiment

FIG. 1 is an illustrative view of a curved surface shape inspection method according to a first embodiment.

In the curved surface shape inspection method according to the present embodiment, a fiber optic block 10 is brought into contact with a measurement surface 21 having a curved surface shape of a to-be-measured object 20, as shown in FIG. 1, to carry out an inspection.

The fiber optic block 10 shown in FIG. 1 is formed by bundling and integrating a plurality of optical fibers 11. The plurality of optical fibers 11 are bundled in such a manner that the optical axes thereof are approximately parallel with each other. The optical fibers 11 are, for example, multimode optical fibers. Each optical fiber 11 is composed of a core region 12 and a clad region 13 surrounding the core region 12. It is noted that the internal structure of the fiber optic block 10 shown in FIG. 1 is enlarged for the sake of convenience in description. Also, the two-dot dashed lines indicate boundaries between optical fibers 11.

The fiber optic block 10 has a semispherical portion 10A and a trunk portion 10B adjacent to the semispherical portion 10A. The semispherical portion 10A has an input end face 14 on the opposite side to the trunk portion 10B. The input end face 14 is composed of one end of each optical fiber 11 and has a semispherical shape. The curvature of the input end face 14 should be an inspection standard.

Also, the trunk portion 10B has an approximately cylindrical shape and has an output end face 15 on the opposite side to the semispherical portion 10A, that is, on the opposite side to the input end face 14 in the optical axis direction of the optical fibers 11. The output end face 15 is approximately perpendicular to the optical axis of each optical fiber 11 and is adapted to output an optical image to be formed by light entering the input end face 14.

Thus, in the fiber optic block 10, light entering the input end face 14 propagates through each optical fiber 11 to be output from the output end face 15. Therefore, an optical image having a pattern corresponding to the pattern of the light entering the input end face 14 is to be output from the output end face 15.

For example, the above-described fiber optic block 10 is first formed by bundling and integrating a plurality of optical fibers 11 into an approximately cylindrical shape, and then produced by polishing one end portion into a semispherical shape.

Figure 2:
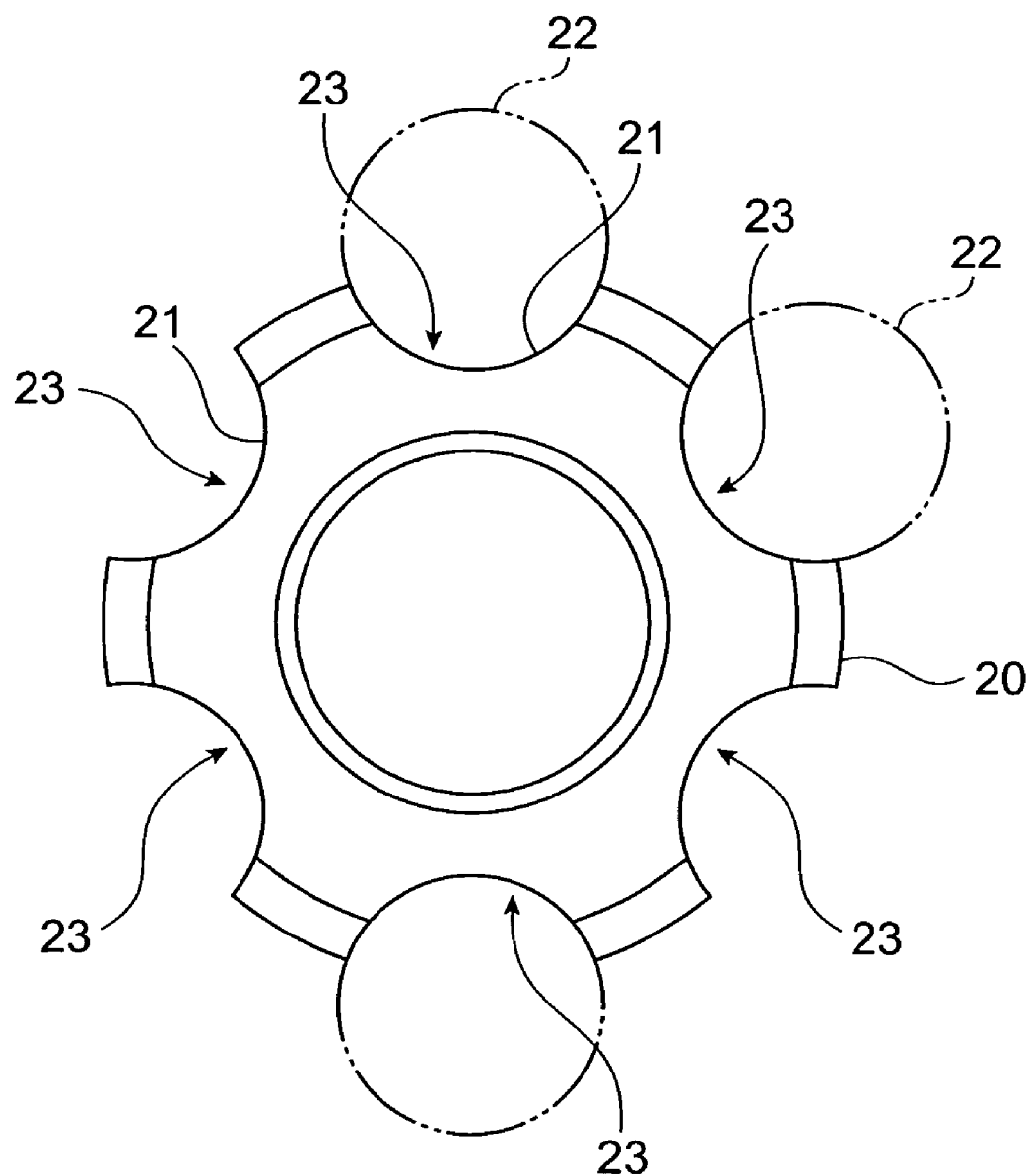
FIG. 2 is a plan view showing the configuration of an example of a to-be-measured object 20.

The to-be-measured object 20 to be inspected preferably using the fiber optic block 10 will here be described. FIG. 2 is a plan view of an example of a to-be-measured object 20. The to-be-measured object 20 shown in FIG. 2 is an inner ring of a constant-velocity joint used in automobiles.

As shown in FIG. 2, the to-be-measured object 20 has a plurality of ball rolling grooves 23 for rolling torque transmitting balls 22 in the circumferential direction. The ball rolling grooves 23 each extend in the shaft line direction of the to-be-measured object 20 (approximately perpendicular to the paper surface). In the constant-velocity joint, the inner ring and an outer ring (not shown in the figure) are coupled to each other via the torque transmitting balls 22. In the constant-velocity joint, when the inner ring is rotated centering on the shaft line, the torque is transmitted to the outer ring via the torque transmitting balls 22. In the present embodiment, the curved surface shape of the inner surface of each ball rolling groove 23 is to be inspected. That is, the inner surface of each ball rolling groove 23 corresponds to the measurement surface 21.

A method of inspecting the curved surface shape of the to-be-measured object 20 will be described with reference to FIG. 1. In the inspection, the input end face 14 of the fiber optic block 10 and the curved measurement surface 21 of the to-be-measured object 20 are pressed against each other. The input end face 14 may be pressed against the measurement surface 21, or the to-be-measured object 20 may be pressed against the input end face 14. When thus pressing the input end face 14 and the measurement surface 21 against each other, the fiber optic block 10 and the to-be-measured object 20 are to be pressed against each other so that the central shaft line a of the fiber optic block 10 intersects with the vicinity of the deepest portion of the ball rolling groove 23.

When the input end face 14 and the measurement surface 21 are pressed against each other, the measurement surface 21 and the input end face 14 are brought into contact with each other at two points because the input end face 14 has a semispherical shape. Conversely, the curvature of the input end face 14 is preset so that the measurement surface 21 and the input end face 14 are brought into contact with each other at two points. Here, as shown in FIG. 1, the regions where the input end face 14 and the measurement surface 21 are in contact with each other are defined as contact portions 30 and 31.

With the formation of the contact portions 30 and 31, an optical image to be output from the output end face 15 varies. More specifically, an optical image corresponding to the contact pattern between the input end face 14 and the measurement surface 21 is to be output from the output end face 15.

Figure 3:
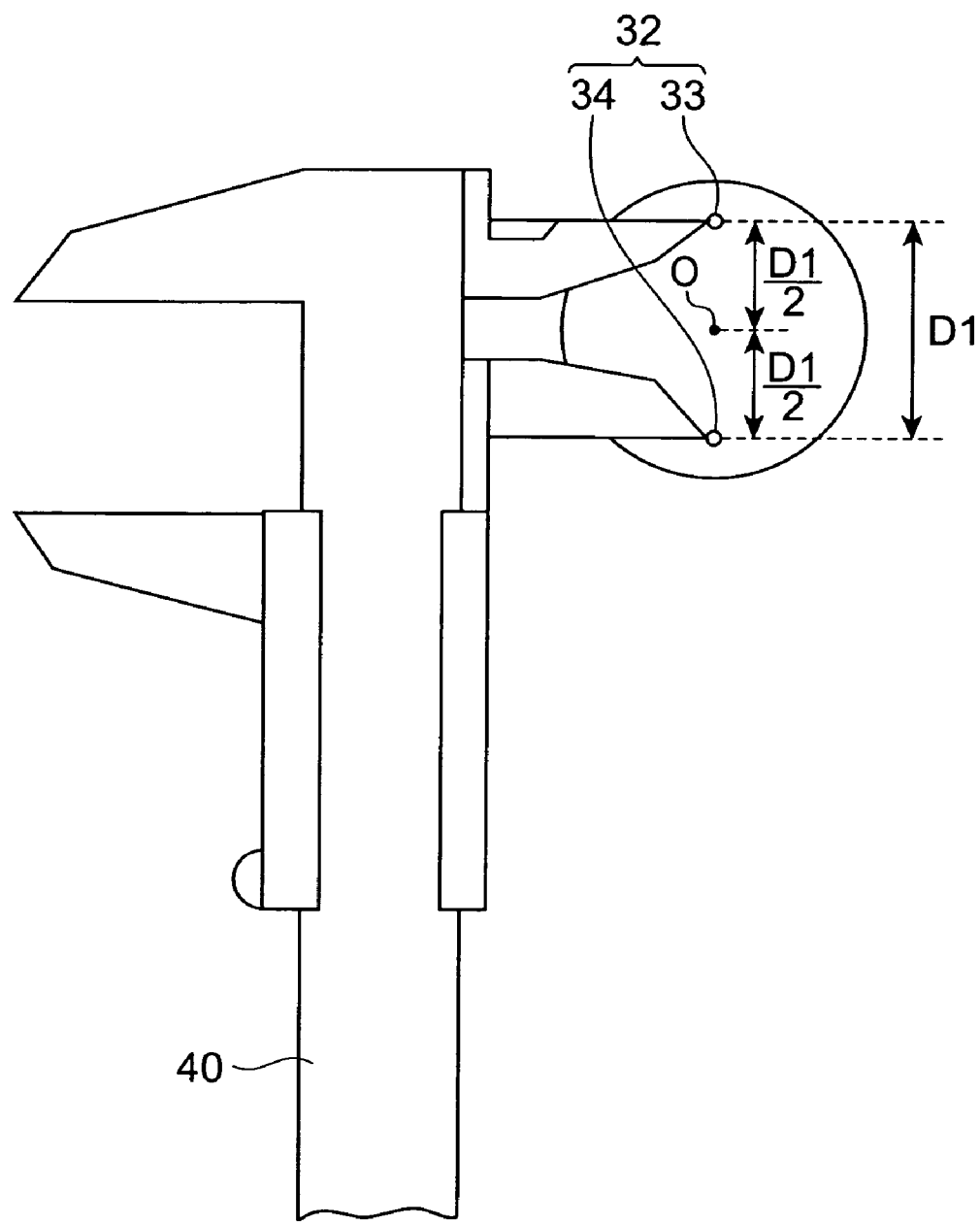
FIG. 3 is a front view of an output end face 15 in an inspection.

FIG. 3 is a front view of the output end face 15 in an inspection.

The optical image 32 shown in FIG. 3 is formed by bringing the input end face 14 into contact with the measurement surface 21 as mentioned above, corresponding to the contact pattern between the input end face 14 and the measurement surface 21. That is, the optical image 32 includes contact portion images 33 and 34 corresponding to the two contact portions 30 and 31 between the input end face 14 and the measurement surface 21.

Since the shape of the input end face 14 is already known, it is possible to predict the distance between the two contact portion images when the measurement surface 21 (i.e. the inner surface of each ball rolling groove 23 in FIG. 2) has a desired curved surface shape. This allows the distance between the two contact portion images 33 and 34 when the measurement surface 21 has the desired curved surface shape to be set as a reference value. It is therefore possible to inspect if the measurement surface 21 has the desired curved surface shape by comparing a measured value of the distance D1 between the contact portion images 33 and 34 that are formed by actually bringing the input end face 14 into contact with the measurement surface 21 with the reference value. It is only required, for example, to use a caliper 40, as shown in FIG. 3, to measure the distance between the contact portion images 33 and 34.

If the to-be-measured object 20 is an inner ring of a constant-velocity joint as in the present embodiment, it is also possible to inspect the uniformity of the curved surface shape of the ball rolling groove 23 in the extending direction by moving at least one of the fiber optic block 10 and the to-be-measured object 20 in the extending direction of the ball rolling groove 23 and by inspecting the change in the distance D1 between the contact portion images 33 and 34.

Further, using the fiber optic block 10 to inspect the curved surface shape for a plurality of ball rolling grooves 23 allows the uniformity of the curved surface shape between respective ball rolling grooves 23 to be inspected.

The semispherical input end face 14 is composed of one end of each optical fiber 11 as mentioned above. Thus, the end face of each optical fiber 11 constituting the input end face 14 is slanted to have a so-called slant shape. Meanwhile, the output end face 15 is approximately perpendicular to the optical axis of each optical fiber 11 to have a planar shape. Therefore, the foregoing contact pattern is downsized to be output from the output end face 15. Consequently, the inspection using the fiber optic block 10 can improve the inspection accuracy.

Although the distance D1 between the contact portion images 33 and 34 may be measured using the caliper 40 as mentioned above, it is preferable to use an inspection pattern 41 on the output end face 15.

FIG. 4 is a front view of the output end face 15 with an inspection pattern 41 formed thereon.

The inspection pattern 41 is composed of, for example, a plurality of concentric patterns such as a pattern example (a) shown in FIG. 4. Scaled patterns with scales such as a pattern example (b) may also be used. The inspection pattern 41 is formed on the output end face 15 through evaporation or etching, etc., or may be formed by attaching a thin sheet.

Thus providing the inspection pattern 41 on the output end face 15 allows for an inspection under one-to-one correspondence between the inspection pattern 41 and the contact portion images 33 and 34 (i.e. optical image 32). Since this requires no additional distance measurement using a caliper, etc., the inspection can be carried out easily.

Figure 5:
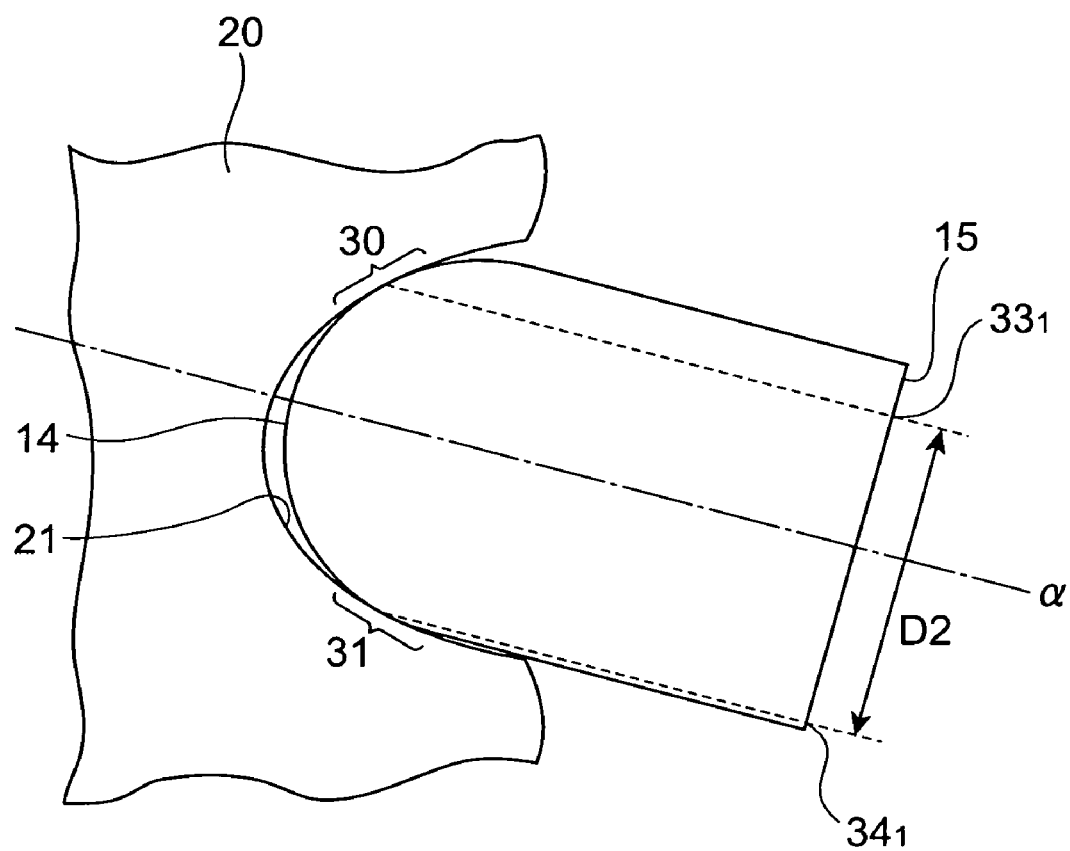
FIG. 5 is an illustrative view of the positional relationship between the fiber optic block 10 and the to-be-measured object 20.

Meanwhile, the distance between the contact portion images 33 and 34 varies depending on the way of arranging the measurement surface 21 and the input end face 14. FIG. 5 is an illustrative view of the positional relationship between the fiber optic block 10 and the to-be-measured object 20. As shown in FIG. 5, if the central shaft line a of the fiber optic block 10 does not run through the vicinity of the deepest portion of the ball rolling groove 23, the distance D2 between contact portion images $33_1$ and $34_1$ that appear on the output end face 15 is smaller than the distance D1 between the contact portion images 33 and 34 shown in FIG. 3, resulting in an inspection error.

If the fiber optic block 10 is set properly with respect to the measurement surface 21 (i.e. so that the central shaft line α runs through the vicinity of the deepest portion of the ball rolling groove 23), the contact portion images 33 and 34 appear at approximately the same distance from the center ○ of the output end face 15 as shown in FIG. 3. It is therefore preferable to provide a positioning pattern 42 composed of two concentric circles on the output end face 15, in consideration of an error based on the positional relationship between the fiber optic block 10 and the to-be-measured object 20 and an inspection specification.

Figure 6:
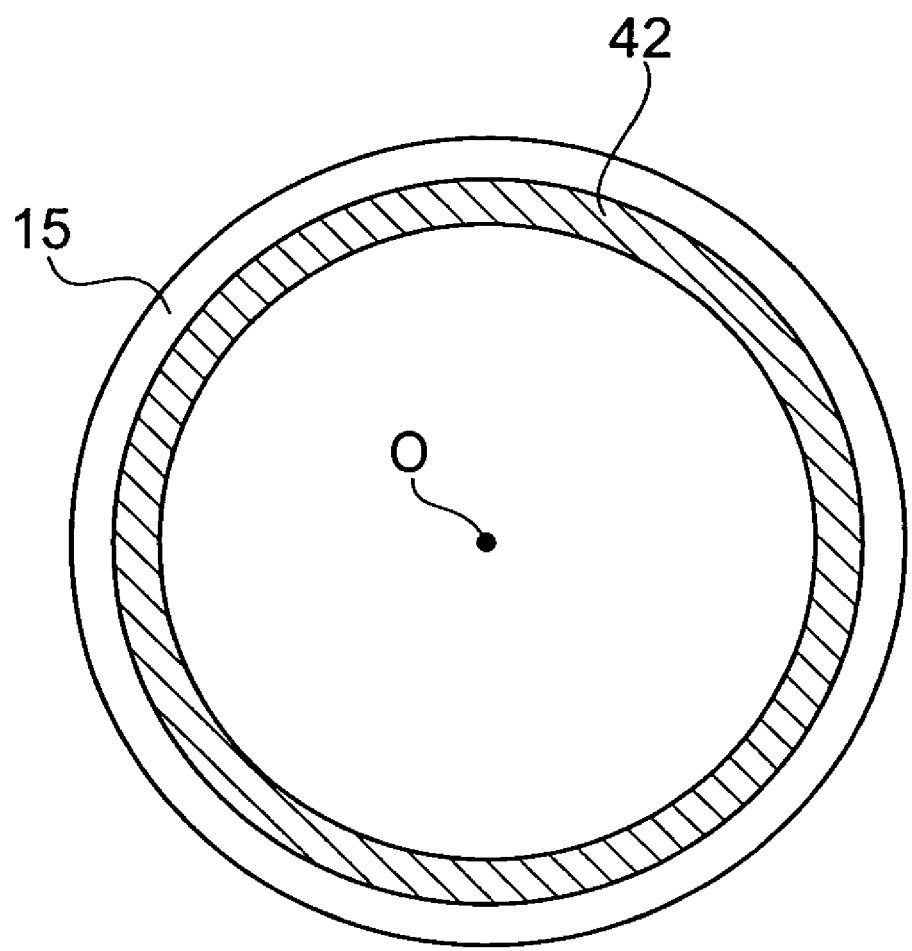
FIG. 6 is a front view of the output end face 15 with a positioning pattern 42 formed thereon.

FIG. 6 is a front view of the output end face 15 with a positioning pattern 42 formed thereon. The positioning pattern 42 may be formed through evaporation or etching, or may be formed by attaching a thin sheet to the output end face 15. In FIG. 6, the hatched portion indicates the positioning pattern 42.

In the case above, it is possible to confirm the set position of the fiber optic block 10 with respect to the measurement surface 21 and to determine the pass/fail of the inspection depending on whether or not the contact portion images 33 and 34 shown in FIG. 3 exist inside the positioning pattern 42. Conversely, it is only required to adjust the position of the fiber optic block 10 or the to-be-measured object 20 so that the contact portion images 33 and 34 exist inside the positioning pattern 42. Thus adjusting the position of the fiber optic block 10 or the to-be-measured object 20 allows the variation of measurement errors for each inspection to be limited within a desired range.

It is noted that if the inspection pattern 41 shown in FIG. 4 is provided on the output end face 15, the inspection pattern 41 may be used as the positioning pattern 42. That is, the inspection pattern 41 functions also as the positioning pattern 42.

In the above-described curved surface shape inspection method using the fiber optic block 10 according to the present embodiment, the curved surface shape of the to-be-measured object 20 is inspected by pressing the input end face 14 and the measurement surface 21 against each other and by measuring the distance D1 between the two contact portion images 33 and 34 output from the output end face 15. Therefore, the inspection can be carried out easily. Also, no fine powder is used, as in the conventional manner, to disturb the environment, resulting in an improvement in workability. Further, since the end face of each optical fiber 11 on the input end face 14 has a slant shape, the contact pattern is to be downsized to be output from the output end face 15. Therefore, the inspection accuracy is improved.

Second Embodiment

FIG. 7(a) is an illustrative view of a curved surface shape inspection method according to a second embodiment. FIG. 7(b) is an enlarged view of the contact portion 31.

In the inspection method according to the first embodiment, the measurement surface 21 and the input end face 14 are in direct contact with each other, but in the inspection method according to the present embodiment, the input end face 14 and the measurement surface 21 are pressed against each other across a film 50 with translucency as shown in FIG. 7(a), and an optical image output from the output end face 15 is used to inspect the curved surface shape of the to-be-measured object 20, as is the case in the first embodiment. It is noted that in FIG. 7(a), the hatched portion indicates the film 50.

The film 50 is, for example, a sheet made of transparent resin. The film 50 may be an organic film produced by evaporating on the input end face 14, or may be a liquid film applied thinly. It is noted that the meaning of the contact between the input end face 14 and the measurement surface 21 in this specification includes the case where the film 50 is thus provided between the measurement surface 21 and the input end face 14.

In the case above, since the film 50 is provided between the measurement surface 21 of the to-be-measured object 20 and the input end face 14, the area of the contact portion 31 between the measurement surface 21 and the input end face 14 is increased as shown in FIG. 7(b). This applies similarly to the contact portion 30.

Figure 8:
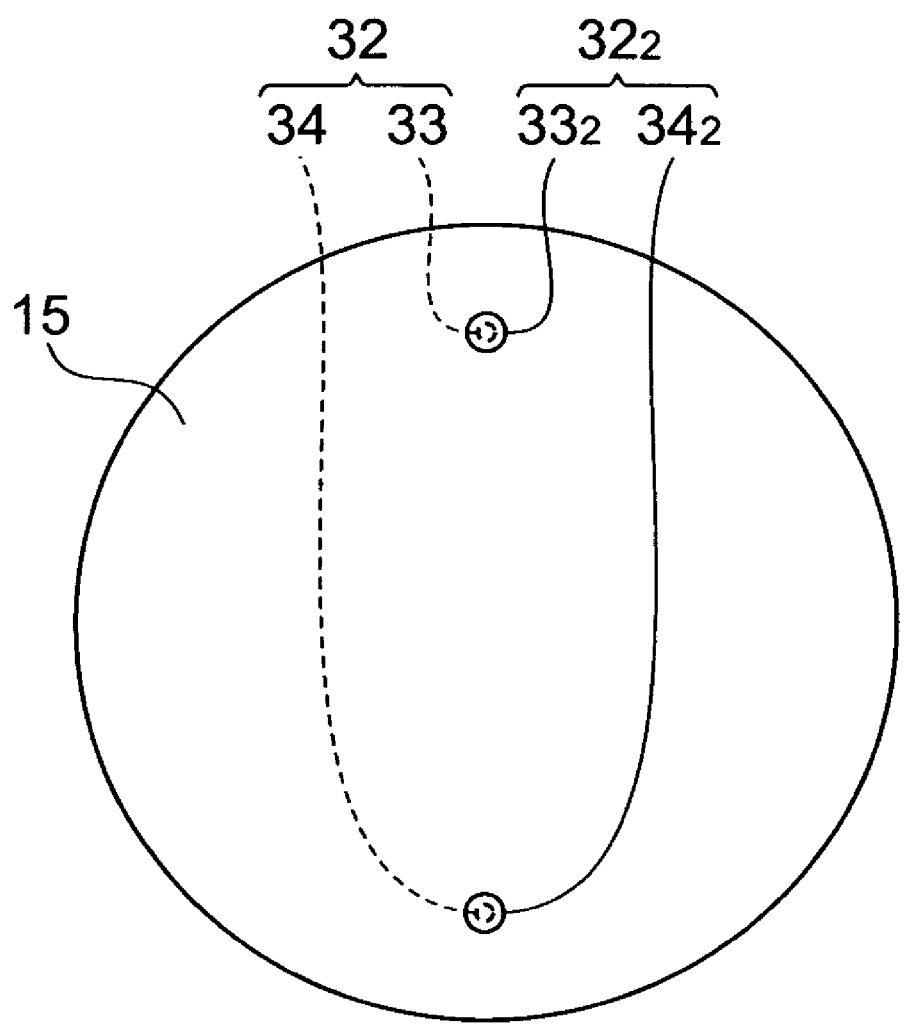
FIG. 8 is a view schematically showing an optical image $32_2$ in an inspection according to the second embodiment.

FIG. 8 is a view schematically showing an optical image $32_2$ in an inspection according to the present embodiment. Since the area of the contact portions 30 and 31 is increased as mentioned above, the area of two contact portion images $33_2$ and $34_2$ to be output from the output end face 15 is also increased. In FIG. 8, the images indicated by the dotted lines are the contact portion images 33 and 34 when the film 50 is not used, being shown for comparative purposes. Since the area of the contact portion images $33_2$ and $34_2$ are to be increased, the optical image $32_2$ formed by bringing the input end face 14 into contact with the measurement surface 21 can be identified easily. In addition, the film 50 protects the input end face 14 of the fiber optic block 10.

Third Embodiment

Figure 9:
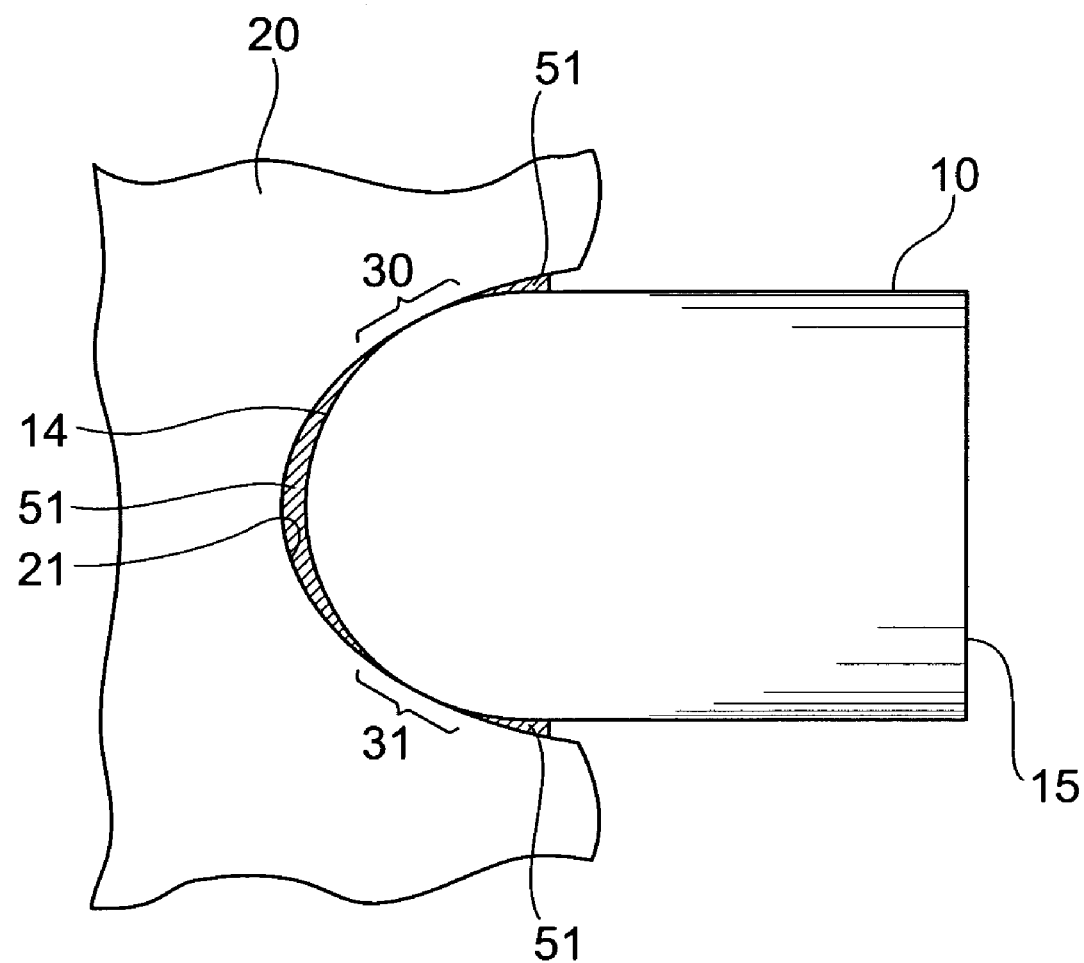
FIG. 9 is an illustrative view of a curved surface shape inspection method according to a third embodiment.

FIG. 9 is an illustrative view of a curved surface shape inspection method according to a third embodiment. The curved surface shape inspection method according to the present embodiment is different from the inspection method according to the first embodiment in using luminescent liquid 51 for producing luminescence. In FIG. 9, the hatched portion indicates the luminescent liquid 51.

The inspection method will here be described. First, the luminescent liquid 51 is applied to the measurement surface 21. The luminescent liquid 51 is, for example, chemical light. Then, the input end face 14 is brought into contact with the measurement surface 21 with the luminescent liquid 51 applied thereto, as is the case in the first embodiment, and an optical image 32 (refer to FIG. 3) output from the output end face 15 is used to carry out the inspection, as is the case in the first embodiment.

In the case above, in the regions where the input end face 14 and the measurement surface 21 are in contact with each other as shown in FIG. 9, that is, in the contact portions 30 and 31, the luminescent liquid 51 applied to the measurement surface 21 is pushed out around the contact portions 30 and 31. Here, the luminescent liquid 51 produces luminescence and the light enters the fiber optic block 10 through the input end face 14 to be output from the output end face 15. In the contact portions 30 and 31, there is little luminescent liquid 51 between the input end face 14 and the measurement surface 21.

Therefore, the areas around the contact portion images 33 and 34 (refer to FIG. 3) on the output end face 15 are brighter than the case with no luminescent liquid 51. Since this improves the contrast of the contact portion images 33 and 34, the inspection can be carried out easily. Also, since the luminescent liquid 51 produces luminescence, there is no need to, for example, illuminate the measurement surface 21.

Fourth Embodiment

Figure 10:
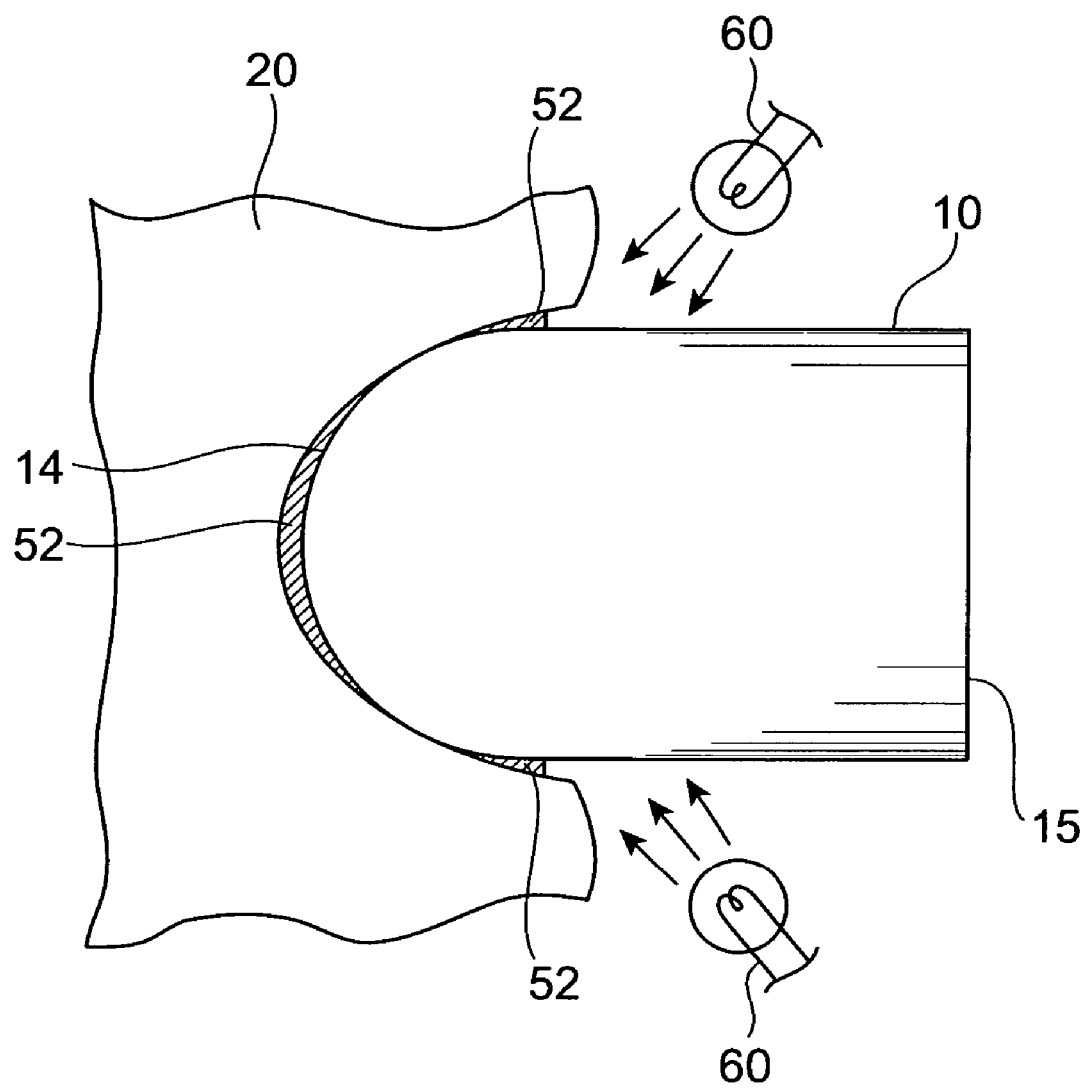
FIG. 10 is an illustrative view of a curved surface shape inspection method according to a fourth embodiment.

FIG. 10 is an illustrative view of a curved surface shape inspection method according to a fourth embodiment. The curved surface shape inspection method according to the present embodiment is different from the inspection method according to the third embodiment in using scattering liquid 52 in which scatterers for scattering light are dispersed, instead of the luminescent liquid 51 in the third embodiment. It is noted that also in FIG. 10, the hatched portion indicates the scattering liquid 52.

The inspection method will here be described. First, the scattering liquid 52 is applied to the measurement surface 21. The scattering liquid 52 is, for example, opalescent suspension liquid. Then, the input end face 14 is brought into contact with the measurement surface 21 with the scattering liquid 52 applied thereto, as is the case in the third embodiment. Here, the scattering liquid 52 applied to the measurement surface 21 is illuminated from the side of the fiber optic block 10, as shown in FIG. 10, using illuminating means 60 such as a light. Then, an optical image 32 (refer to FIG. 3) output from the output end face 15 is used to carry out the inspection, as is the case in the first embodiment.

Also in the case above, in the regions where the input end face 14 and the measurement surface 21 are in contact with each other as shown in FIG. 10, that is, in the contact portions 30 and 31, the scattering liquid 52 applied to the measurement surface 21 is pushed out around the contact portions 30 and 31. When the illuminating means 60 illuminates the scattering liquid 52, in which scatterers for scattering light are dispersed as mentioned above, the illumination light is scattered. Therefore, since the areas around where the input end face 14 and the measurement surface 21 are in contact with each other become brighter, as is the case in the third embodiment, the contrast of the contact portion images 33 and 34 on the output end face 15 is increased. Accordingly, the inspection can be carried out easily.

Fifth Embodiment

Figure 11:
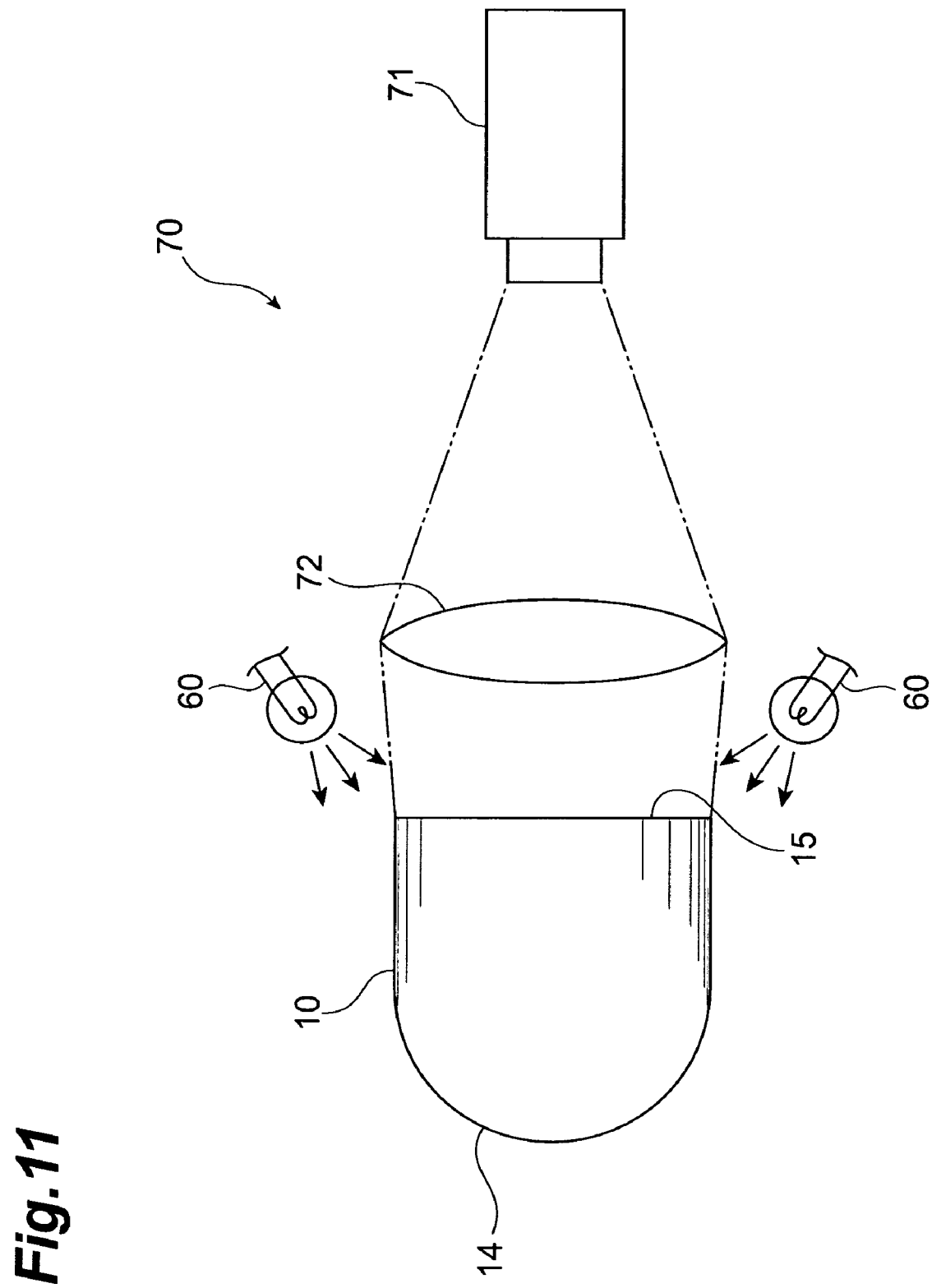
FIG. 11 is a view schematically showing the configuration of a curved surface shape inspection apparatus according to a fifth embodiment.

FIG. 11 is a view schematically showing the configuration of a curved surface shape inspection apparatus (hereinafter referred to simply as "inspection apparatus") according to the present embodiment.

The inspection apparatus 70 according to the present embodiment includes a fiber optic block 10, imaging means 71, a lens system 72, and illuminating means 60.

The imaging means 71 is, for example, a CCD camera, being connected electrically to a monitor, etc. The lens system 72 is arranged between the output end face 15 and the imaging means 71 to input an optical image output from the output end face 15 to the imaging means 71. Although only one lens is shown in FIG. 11, a plurality of lenses may be used. The illuminating means 60 is provided in such a manner as to face the input end face 14 on the side of the fiber optic block 10, capable of illuminating the input end face 14. The illuminating means 60 is, for example, a light.

In an inspection method using the inspection apparatus 70 according to the present embodiment, the input end face 14 is brought into contact with the measurement surface 21 (refer to FIG. 1), as is the case in the first embodiment. Then, an optical image 32 (refer to FIG. 3) output from the output end face 15 when the measurement surface 21 and the input end face 14 are in contact with each other is taken by the imaging means 71 via the lens system 72. The illuminating means 60 illuminates the input end face 14 when carrying out the inspection. In the inspection, since the input end face 14 and the measurement surface 21 are in contact with each other, illuminating the input end face 14 causes the measurement surface 21 to also be illuminated.

In the case of the present embodiment, the optical image 32 including the two contact portion images 33 and 34 (refer to FIG. 3) is to be taken by the imaging means 71. Then, the distance between the contact portion images 33 and 34 displayed on the monitor, etc., is to be measured. Thus inspecting the curved surface shape based on the contact portion images 33 and 34 displayed on the monitor, etc., allows the inspection to be carried out easily and automatically. The inspection can also be carried out based on data of the optical image 32 that is converted into an electrical signal by the imaging means 71. This can improve the inspection accuracy.

Also, as mentioned above, when the illuminating means 60 illuminates the input end face 14 in the inspection, the measurement surface 21 of the to-be-measured object 20 is also illuminated. It is therefore possible to make the contact portion images 33 and 34 output from the output end face 15 clearer. In addition, the contact portion images 33 and 34 output from the output end face 15 are input to the imaging means 71 through the lens system 72. Therefore, the contact portion images 33 and 34 can be, for example, enlarged through the lens system 72 to be input to the imaging means 71, which allows the inspection to be carried out using a further enlarged optical image 32, whereby the inspection can be carried out easily.

Sixth Embodiment

Figure 12:
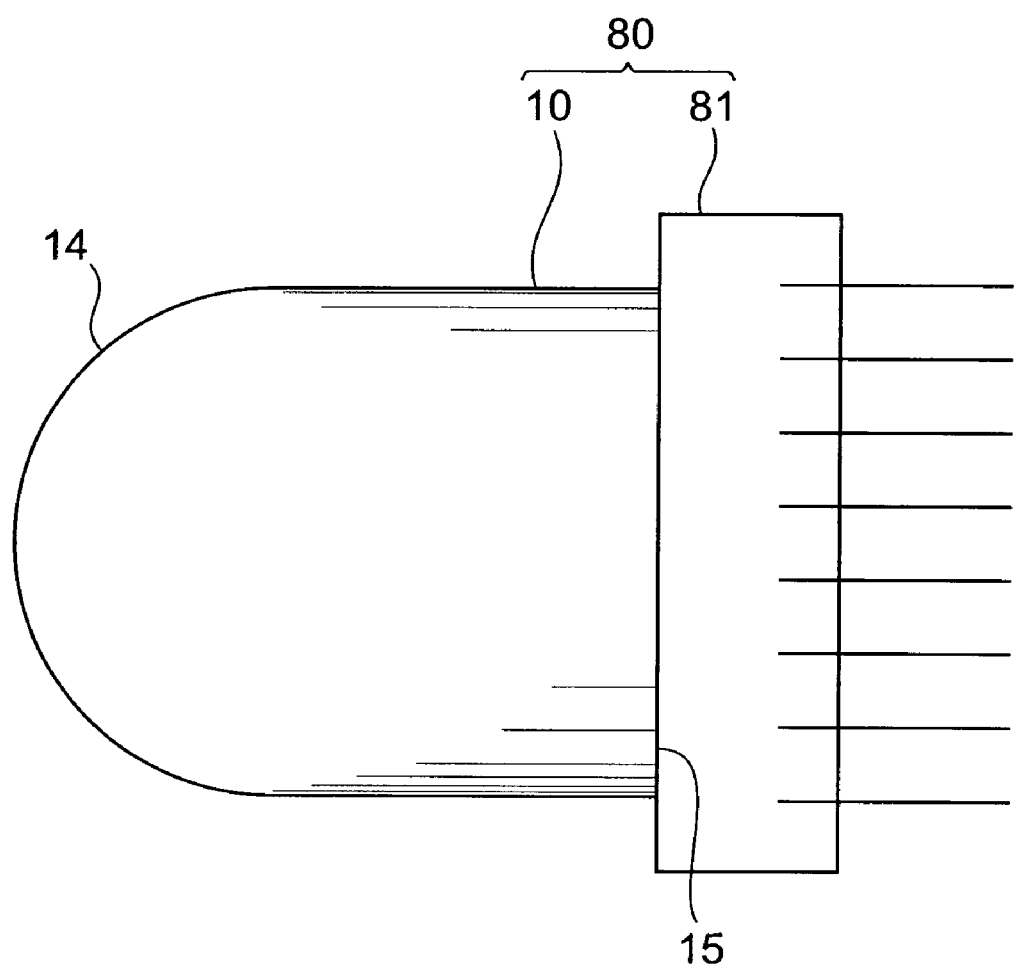
FIG. 12 is a view schematically showing the configuration of a curved surface shape inspection apparatus according to a sixth embodiment.

FIG. 12 is a view schematically showing the configuration of an inspection apparatus 80 according to the present embodiment. The inspection apparatus 80 includes a fiber optic block 10 and imaging means 81. The inspection apparatus 80 is different from the inspection apparatus 70 according to the fifth embodiment in that the imaging means 81 is attached to the output end face 15. The imaging means 81 is, for example, a CCD imaging device.

The method of inspecting the curved surface shape of the to-be-measured object 20 using the inspection apparatus 80 is the same as in the fifth embodiment, except that an optical image 32 (refer to FIG. 3) output from the output end face 15 is taken directly by the imaging means 71 without involving the lens system 72. It is noted that although the inspection apparatus 80 has no illuminating means 60 as in the inspection apparatus 70, the measurement surface 21 and the input end face 14 are to be illuminated by illuminating means 60 such as a light (refer to FIG. 11) from the side of the fiber optic block 10 via the side surface of the fiber optic block 10 in the inspection.

In the case of the present embodiment, since the imaging means 81 is attached directly to the fiber optic block 10, it is possible to reduce the size of the inspection apparatus 80 so as to be easily carried. It is therefore possible to, for example, inspect the to-be-measured object 20 easily in real time when produced. Then, since the optical image 32 output from the output end face 15 is taken by the imaging means 81, it is possible to carry out the inspection based on the optical image 32 that is displayed on a monitor, etc., as is the case in the fifth embodiment. The inspection can also be carried out based on data of the optical image 32 that is converted into an electrical signal by the imaging means 81. This can further improve the inspection accuracy.

Seventh Embodiment

Figure 13:
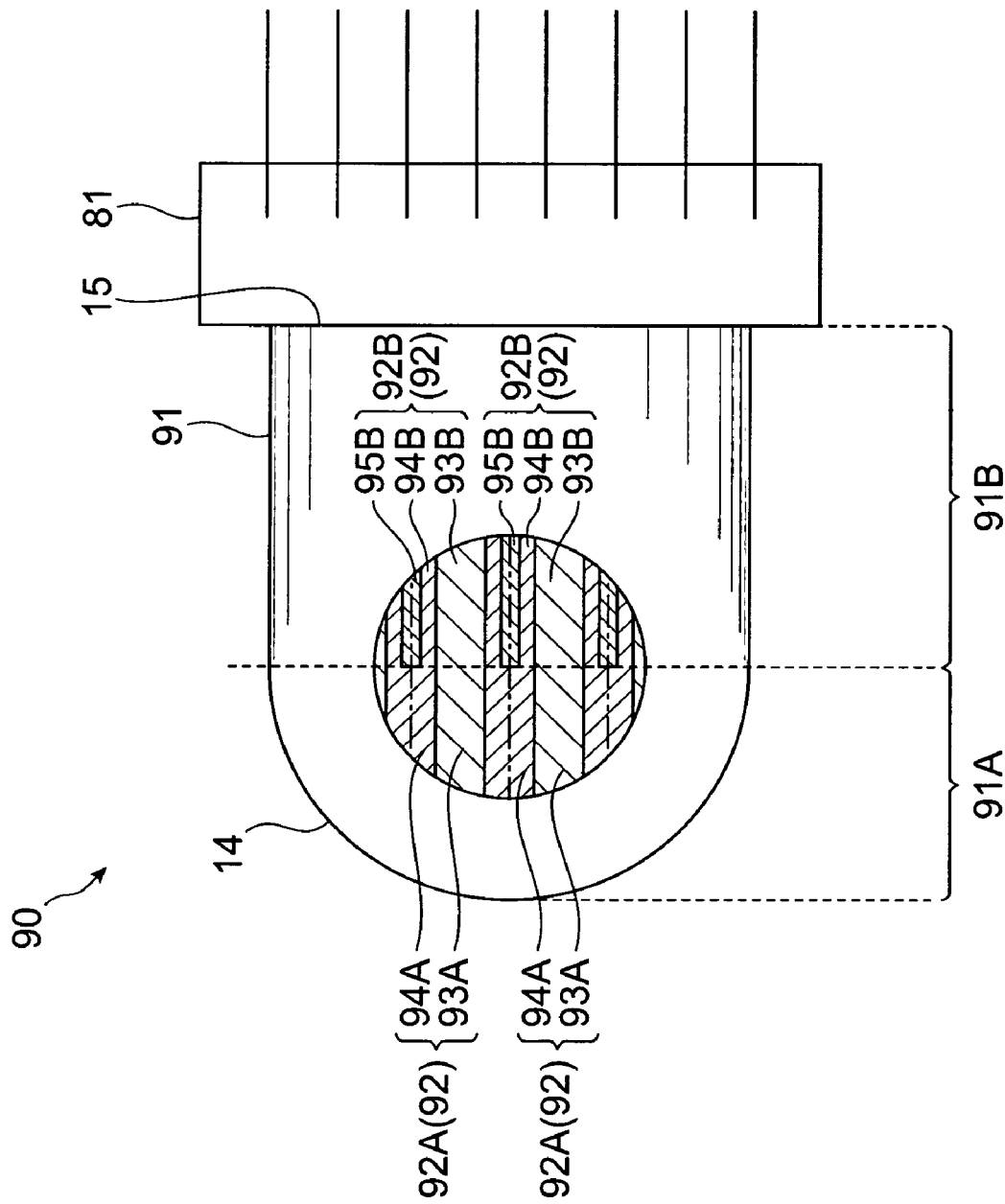
FIG. 13 is a view schematically showing the configuration of a curved surface shape inspection apparatus according to a seventh embodiment.

FIG. 13 is a view schematically showing the configuration of an inspection apparatus 90 according to the present embodiment. The inspection apparatus 90 shown in FIG. 13 is different from the inspection apparatus 80 according to the fifth embodiment in using a fiber optic block 91 in which a light absorber for absorbing light is provided in a predetermined region including the output end face 15. The fiber optic block 91 is formed by bundling and integrating a plurality of optical fibers 92, as is the case in the first embodiment, having a semispherical portion 91A and a trunk portion (the predetermined region including the output end face 15) 91B.

However, each of the optical fibers 92 has different configurations, respectively, within the semispherical portion 91A and the trunk portion 91B. In the present embodiment, a reference A will be added to be "optical fiber 92A" when describing each optical fiber 92 within the semispherical portion 91A. Also, a reference B will be added to be "optical fiber 92B" when describing each optical fiber 92 within the trunk portion 91B. As is the case in the first embodiment, the internal structure of the fiber optic block 91 shown in FIG. 9 is enlarged for the sake of convenience in description. Also, the two-dot dashed lines indicate boundaries between optical fibers 92.

As shown in FIG. 13, each optical fiber 92A constituting the semispherical portion 91A is composed of a core region 93A and a clad region 94A provided in such a manner as to surround the core region 93A.

Also, each optical fiber 92B constituting the trunk portion 91B is composed of a core region 93B, a clad region 94B surrounding the core region 93B, and a light absorber 95B provided in such a manner as to further surround the clad region 94B to absorb light.

The difference in refractive index between the core regions 93B and the clad regions 94B in the trunk portion 91B is smaller than that between the core regions 93A and the clad regions 94A in the semispherical portion 91A. That is, the N.A. of each optical fiber 92B in the trunk portion 91B is smaller than that of each optical fiber 92A in the semispherical portion 91A.

It is only required to manufacture the above-described fiber optic block 91 as follows, for example. First, a plurality of optical fibers 92A are bundled and integrated to form a semispherical fiber optic block to be the semispherical portion 91A. Also, the same number of optical fibers 92B as that of the plurality of optical fibers 92A constituting the semispherical portion 91A are bundled and integrated to form an approximately cylindrical fiber optic block to be the trunk portion 91B.

Then, the semispherical portion 91A and the trunk portion 91B are joined together to be the fiber optic block 91. The semispherical portion 91A and the trunk portion 91B are joined together so that the optical axes of the corresponding optical fibers 92A and 92B are aligned. In the fiber optic block 91, the optical fibers 92A and 92B are integrated to function as one optical fiber.

The method of inspecting the curved surface shape of the to-be-measured object 20 using the inspection apparatus 90 is the same as in the fifth embodiment.

As mentioned above, no light absorber for absorbing light is provided in the semispherical portion 91A. It is therefore possible to illuminate the measurement surface 21 (refer to FIG. 1) of the to-be-measured object 20 via the semispherical portion 91A using a light, etc. This can make the optical image 32 (refer to FIG. 3) composed of the contact portion images 33 and 34 clearer.

On the contrary, since the light absorbers 95B are provided in the trunk portion 91B, light not propagating through the core regions 93B in the trunk portion 91B is to be absorbed by the light absorbers 95B. It is therefore possible to suppress crosstalk due to light leaking from the core region 93B of one of the adjacent optical fibers 92B entering the core region 93B of the other optical fiber 92B. In addition, light entering from other than the input end face 14, for example, from the side of the fiber optic block 91 can be absorbed by the light absorbers 95B.

Thus, light propagating through the core regions 93A and 93B of the respective optical fibers 92A and 92B, that is, light reflecting more of the contact pattern between the input end face 14 and the measurement surface 21 forms the optical image 32, resulting in an increase in S/N ratio of the optical image 32.

Also, as mentioned above, the difference in refractive index between the core regions 93B and the clad regions 94B in the trunk portion 91B is smaller than that between the core regions 93A and the clad regions 94A in the semispherical portion 91A (more specifically at the input end face 14). It is therefore difficult to trap light in the core regions 93B in the trunk portion 91B.

This causes higher mode light to leak from the core regions 93B easily. Higher mode light may not reflect the contact pattern, and is likely to be output from the output end face 15 at various angles, which may reduce the S/N ratio of the optical image. Such light is eliminated from the core regions 93B. Then, light leaking from the core regions 93B is absorbed by the light absorbers 95B as mentioned above. Therefore, the S/N ratio of the optical image 32 tends to be further increased.

Accordingly, using the inspection apparatus 90 according to the present embodiment allows for a more accurate inspection. It is noted that although the difference in refractive index between the core region 93B and the clad region 94B is smaller than that between the core region 93A and the clad region 94A in the present embodiment, the differences in refractive index may be the same. It is however preferable that the difference be smaller on the trunk portion 91B, as mentioned above.

Although the predetermined region including the output end face 15 is defined as the trunk portion 91B in the present embodiment, it is only required to arrange the light absorbers 95B so that the input end face 14 or the measurement surface 21 can be illuminated. Therefore, the light absorbers 95B may not be provided all over the optical axis direction of the optical fibers 92B. The light absorbers 95B may also be provided partially into the semispherical portion 91A on the trunk portion 91B side.

Although the preferred embodiments of the present invention have been described heretofore, it will be understood that the present invention is not restricted to the first to seventh embodiments.

FIG. 14 is a side view showing an exemplary variation of a fiber optic block 10. The curved surface shape of the to-be-measured object 20 may be inspected using a fiber optic block composed only of a semispherical portion, that is, a semispherical fiber optic block such as the fiber optic block 100 shown in the configuration example (a) of FIG. 14. Also, the input end face 102 on the opposite side to the output end face 15 may not have a semispherical shape, and it is only required that regions (forming contact portions 30 and 31) to be brought into contact with the measurement surface 21 are curved, as represented by the fiber optic block 101 shown in the configuration example (b).

Further, the fiber optic block 103 shown in the configuration example (c) may be used. In the fiber optic block 103, a plurality of optical fibers 11 are bundled into a hollow shape so as to form a cavity 104 in the vicinity of the central shaft line α. Then, the cavity 104 is filled with a dummy member 105 for inhibiting light to propagate therethrough. If a plurality of optical fibers 11 are thus bundled into a hollow shape, it is possible to reduce the number of optical fibers 11 to be used relative to the case where they are bundled in a solid manner. It is noted that the inspection can be carried out even if the cavity 104 may not be filled with the dummy member 105 to be a hollow state.

Figure 15:
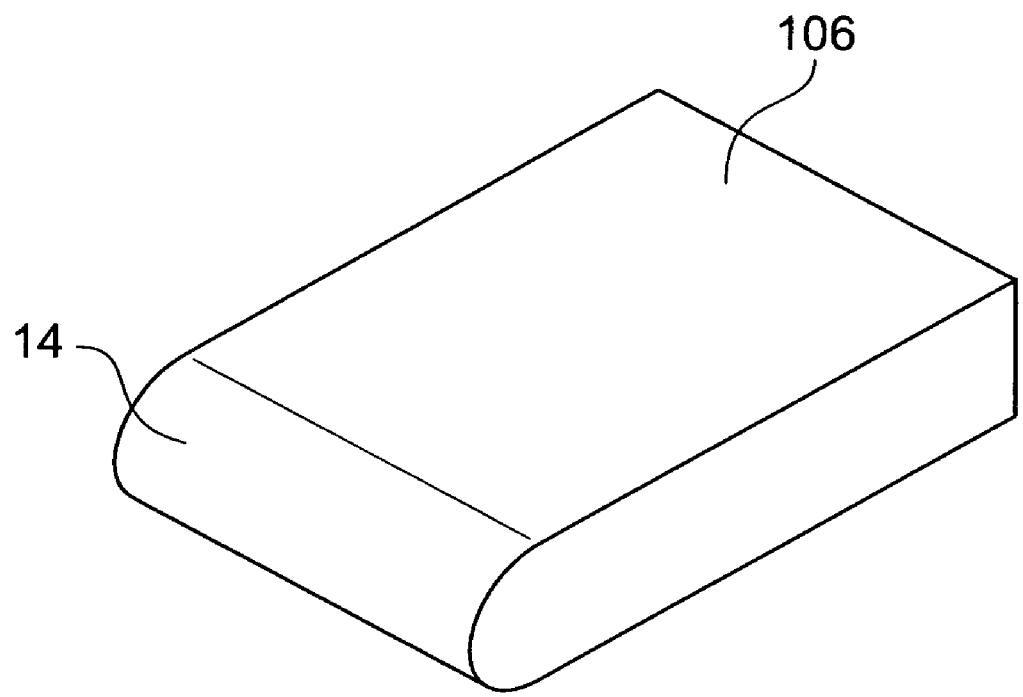
FIG. 15 is a perspective view showing another exemplary variation of a fiber optic block.

Furthermore, the input end face 14 may have a cylindrical shape as represented by the fiber optic block 106 shown in FIG. 15. In this case, it is also possible, for example, to inspect the curved surface shape of a ball rolling groove 23 in the extending direction through a single measurement. Also, the fiber optic block 91 described in the seventh embodiment may be applied to the curved surface shape inspection methods according to the first to sixth embodiments. Further, the methods according to the second to fourth embodiments may be employed to inspect the curved surface shape of the to-be-measured object 20 using the inspection apparatus 70, 80, or 90.

Moreover, although the to-be-measured object 20 is an inner ring in a constant-velocity joint in the first to seventh embodiments, the to-be-measured object is not restricted thereto. The to-be-measured object is only required to have a curved surface shape, and the inspection method is not restricted to the measurement of the distance between two contact portion images 33 and 34.

For example, the curvature of the input end face 14 is set to have a desired curvature of a measurement surface to be inspected. If the measurement surface has the desired curvature, almost all of the input end face 14 is to be brought into contact with the measurement surface and an optical image reflecting the contact is to be output from the output end face 15. It is therefore possible to inspect if the measurement surface has the desired shape by observing the pattern of the optical image that is formed by bringing the input end face 14 into contact with the measurement surface.

In a curved surface shape inspection method according to the present invention, it is generally preferred that in a fiber optic block formed by bundling and integrating a plurality of optical fibers each composed of a core region and a clad region surrounding the core region, an at least partially curved input end face composed of one end of each optical fiber and a curved measurement surface of a to-be-measured object are pressed against each other, and an optical image formed by bringing the input end face into contact with the measurement surface and output from an output end face of the fiber optic block that is positioned on the opposite side to the input end face is used to inspect the curved surface shape of the to-be-measured object.

In the method above, the input end face of the fiber optic block composed of the plurality of optical fibers and the curved measurement surface of the to-be-measured object are pressed against each other. Then, the optical image formed by bringing the input end face into contact with the measurement surface and output from the output end face of the fiber optic block is used to inspect the curved surface shape of the to-be-measured object.

The optical image is formed by bringing the input end face into contact with the measurement surface, corresponding to the contact pattern between the input end face and the measurement surface. Therefore, the curved surface shape of the to-be-measured object can be inspected by inspecting the optical image. In the case above, since the curved surface shape of the to-be-measured object can be inspected only by pressing the fiber optic block against the to-be-measured object, the inspection can be carried out easily. In addition, no fine powder is used, resulting in an improvement in workability.

Also, in the curved surface shape inspection method, it is preferred that the measurement surface is an inner surface of a groove included in the to-be-measured object and the optical image includes two contact portion images corresponding to the two respective contact portions of the input end face and the measurement surface, and wherein the distance between the two contact portion images is measured to inspect the curved surface shape of the to-be-measured object.

In the case above, the curved surface shape of the to-be-measured object is inspected by measuring the distance between the two contact portion images output from the output end face with the inner surface of the groove and the input end face being pressed against each other. Since the shape of the input end face is already known, it is possible to predict the distance between the two contact portion images when the inner surface of the groove has a desired curved surface shape. This allows the distance between the two contact portion images when the inner surface of the groove has the desired curved surface shape to be set as a reference value. It is therefore possible to inspect if the groove has the desired curved surface shape by comparing a measured value of the distance between the two contact portion images that are formed by actually bringing the input end face into contact with the inner surface of the groove with the reference value.

Further, in the curved surface shape inspection method, imaging means is preferably used to take the optical image. In this case, since the optical image is taken by the imaging means, it is only required to inspect the curved surface shape using the optical image displayed on a monitor, etc. This allows the inspection to be carried out easily and automatically.

Also, in the curved surface shape inspection method, the fiber optic block preferably has a predetermined region including the output end face in which a light absorber for absorbing light is provided in such a manner as to surround the clad region in each optical fiber. In this case, light not propagating through the core regions in the optical fibers is to be absorbed by the light absorber in the predetermined region including the output end face. Therefore, light entering the fiber optic block through other than the input end face and light leaking from the core regions in the optical fibers is to be absorbed by the light absorber. This increases the S/N ratio of the optical image.

Further, in the curved surface shape inspection method using the fiber optic block including the light absorber, it is preferred that the difference in refractive index between the core region and the clad region in each optical fiber is smaller in the predetermined region than at the input end face. In this case, it is difficult to trap light in the core regions in the predetermined region. This causes higher mode light to leak from the core regions easily. Then, light leaking from the core regions is to be absorbed by the light absorber. Therefore, the S/N ratio of the optical image is further increased.

Furthermore, in the curved surface shape inspection method, it is preferred that the input end face and the measurement surface are pressed against each other across a film with translucency, and the optical image output from the output end face is used to inspect the curved surface shape of the to-be-measured object. In this case, since the film is provided between the measurement surface of the to-be-measured object and the input end face, the area of the contact portion between the measurement surface and the input end face is increased. Therefore, the optical image formed by bringing the input end face into contact with the measurement surface can be identified easily. In addition, the film protects the input end face of the fiber optic block. It is noted that the meaning of the film includes a sheet and a liquid film.

In addition, in the curved surface shape inspection method, it is preferred that an inspection pattern provided on the output end face is compared with the optical image to inspect the curved surface shape of the to-be-measured object. In this case, since the inspection pattern provided on the output end face is compared directly with the optical image, the inspection can be carried out easily. It is noted that the inspection pattern is, for example, a scaled pattern.

Further, in the curved surface shape inspection method, it is preferred that luminescent liquid for producing luminescence is applied to the measurement surface and the measurement surface with the luminescent liquid applied thereto and the input end face are pressed against each other, and the optical image output from the output end face is used to inspect the curved surface shape of the to-be-measured object. In this case, when the measurement surface of the to-be-measured object and the input end face are pressed against each other, the luminescent liquid within the region where the input end face and the measurement surface are in contact with each other is pushed aside. Therefore, a region around the region where the input end face and the measurement surface are in contact with each other becomes brighter than the case with no luminescent liquid. Since this improves the contrast of the optical image, the inspection can be carried out easily.

Furthermore, in the curved surface shape inspection method, it is preferred that scattering liquid including scatterers is applied to the measurement surface and the measurement surface with the scattering liquid applied thereto and the input end face are pressed against each other, and the optical image output from the output end face is used to inspect the curved surface shape of the to-be-measured object. In this case, when the measurement surface of the to-be-measured object and the input end face are pressed against each other, the scattering liquid within the region where the input end face and the measurement surface are in contact with each other is pushed aside. Therefore, a region around the region where the input end face and the measurement surface are in contact with each other becomes brighter than the case with no scattering liquid.

Also, in the curved surface shape inspection method, it is preferred that the position of at least one of the fiber optic block and the to-be-measured object is adjusted so that the optical image is positioned within a predetermined range of a positioning pattern provided on the output end face. In this case, the position of at least one of the fiber optic block and the to-be-measured object is adjusted so that the optical image is positioned within the predetermined range of the positioning pattern. It is therefore possible to limit the variation of measurement errors for each inspection within a desired range.

Also, it is generally preferred that a fiber optic block according to the present invention is adapted to be applied to an inspection of the curved surface shape of a to-be-measured object and is formed by bundling and integrating a plurality of optical fibers each composed of a core region and a clad region surrounding the core region, the fiber optic block including: an at least partially curved input end face composed of one end of each optical fiber; and an output end face positioned on the opposite side to the input end face and adapted to output an optical image to be formed by light entering the input end face.

In the thus arranged fiber optic block, light entering each optical fiber through the at least partially curved input end face is to be guided through each optical fiber. Then, an optical image to be formed by light that has propagated through each optical fiber is to be output from the output end face.

The curved surface shape of the to-be-measured object is inspected by pressing the input end face against the curved measurement surface of the to-be-measured object. In this case, the optical image corresponds to the contact pattern between the input end face and the measurement surface. Therefore, the curved surface shape of the to-be-measured object can be inspected by inspecting the optical image.

Here, the inspection is to be carried out by, for example, comparing an optical image that has actually been output from the output end face with an optical image to be formed when the to-be-measured object has a desired curved surface shape. In an inspection of the curved surface shape using the thus arranged fiber optic block, since the curved surface shape of the to-be-measured object can be inspected only by pressing the block against the to-be-measured object, the inspection can be carried out easily. In addition, no fine powder is used, resulting in an improvement in workability.

Further, in the fiber optic block, the input end face preferably has a semispherical shape. In this case, the block can be used suitably for an inspection of a to-be-measured object having a spherical groove, etc.

Furthermore, the fiber optic block preferably has a predetermined region including the output end face in which a light absorber for absorbing light is provided in such a manner as to surround the clad region in each optical fiber. In this case, light not propagating through the core regions is to be absorbed by the light absorber in the predetermined region including the output end face. Therefore, the S/N ratio of the optical image can be increased.

Also, in the fiber optic block having the light absorber, it is preferred that the difference in refractive index between the core region and the clad region in each optical fiber is smaller in the predetermined region than at the input end face. In this case, it is difficult to trap light in the core regions in the predetermined region, which causes higher mode light to leak from the core regions easily. Then, light leaking from the core regions is to be absorbed by the light absorber. Therefore, the S/N ratio of the optical image is further increased.

Further, in the fiber optic block, it is preferred that an inspection pattern for inspecting the curved surface shape of the to-be-measured object is provided on the output end face. In this arrangement, the optical image appears on the inspection pattern. As mentioned above, the optical image corresponds to the contact pattern between the measurement surface and the input end face in the inspection of the curved surface shape of the to-be-measured object. Therefore, the curved surface shape of the to-be-measured object can be inspected by comparing the inspection pattern and the optical image.

Moreover, in the fiber optic block, it is preferred that a positioning pattern for adjusting the position with respect to the to-be-measured object is provided on the output end face.

In this case, the fiber optic block is pressed against the to-be-measured object for inspection so that the optical image is included within the predetermined range of the positioning pattern. This allows the variation of measurement errors for each inspection to be limited within a desired range.

Also, in the fiber optic block, the plurality of optical fibers are preferably bundled into a hollow shape. In this case, since the plurality of optical fibers are bundled into a hollow shape, it is possible to reduce the number of optical fibers to be used relative to the case where bundled in a solid manner.

Also, a curved surface shape inspection apparatus is generally for inspecting the curved surface shape of a to-be-measured object, preferably including: a fiber optic block having the above configuration; and imaging means provided in such a manner as to face the output end face of the fiber optic block and adapted to take an optical image output from the output end face.

In the arrangement above, the optical image output from the output end face of the fiber optic block according to the present invention is to be taken by the imaging means. In an inspection of the curved surface shape of the to-be-measured object, an optical image to be formed when the curved measurement surface of the to-be-measured object and the input end face are pressed against each other corresponds to the contact pattern between the measurement surface and the input end face. Therefore, the curved surface shape of the to-be-measured object can be inspected using the optical image. Then, in the thus arranged curved surface shape inspection apparatus, since the optical image output from the output end face is taken by the imaging means, it is possible to carry out the inspection using the optical image displayed on a monitor, etc. Accordingly, the inspection can be carried out easily and automatically.

Further, the curved surface shape inspection apparatus preferably includes illuminating means provided in such a manner as to face the input end face and adapted to illuminate the input end face. In this case, since the illuminating means is provided in such a manner as to face the input end face, illuminating the input end face using the illuminating means when the input end face is pressed against the to-be-measured object in the inspection of the curved surface shape of the to-be-measured object causes the measurement surface of the to-be-measured object to be also illuminated. Therefore, the optical image to be output from the output end face can be made clearer.

In addition, the curved surface shape inspection apparatus preferably includes a lens system arranged between the output end face and the imaging means and adapted to input the optical image to the imaging means. In this case, the lens system inputs the optical image to the imaging means. Therefore, the optical image can be, for example, enlarged through the lens system to be input to the imaging means.

INDUSTRIAL APPLICABILITY

The present invention is applicable to a curved surface shape inspection method capable of inspecting the shape of a curved surface easily, a fiber optic block to be used in the inspection method, and a curved surface shape inspection apparatus to which the fiber optic block is applied.

The invention claimed is:

1. A curved surface shape inspection method, wherein
   a fiber optic block formed by bundling and integrating a plurality of optical fibers each composed of a core region and a clad region surrounding the core region, and comprising an at least partially curved convex input end face composed of one end of each optical fiber and an output end face that is positioned on the opposite side to the input end face, is prepared for a to-be-measured object including a measurement surface having a curved concave surface shape;
   the input end face of the fiber optic block and the measurement surface of the to-be-measured object are pressed against each other, and
   an optical image formed by bringing the input end face into contact with the measurement surface and output from the output end face of the fiber optic block is used to inspect the curved concave surface shape of the measurement surface of the to-be-measured object, wherein
   the measurement surface of the to-be-measured object is an inner surface of a groove included in the to-be-measured object, and
   the optical image output from the output end face of the fiber optic block includes two contact portion images corresponding to the two respective contact portions of the input end face and the measurement surface, and wherein
   the distance between the two contact portion images is measured to inspect the curved concave surface shape of the measurement surface of the to-be-measured object.

2. The curved surface shape inspection method according to claim 1, wherein imaging means is used to take the optical image.

3. The curved surface shape inspection method according to claim 1, wherein the fiber optic block has a predetermined region including the output end face in which a light absorber for absorbing light is provided in such a manner as to surround the clad region in each optical fiber.

4. The curved surface shape inspection method according to claim 3, wherein the difference in refractive index between the core region and the clad region in each optical fiber is smaller in the predetermined region than at the input end face.

5. The curved surface shape inspection method according to claim 1, wherein the input end face and the measurement surface are pressed against each other across a film with translucency, and the optical image output from the output end face is used to inspect the curved surface shape of the to-be-measured object.

6. The curved surface shape inspection method according to claim 1, wherein an inspection pattern provided on the output end face is compared with the optical image to inspect the curved surface shape of the to-be-measured object.

7. The curved surface shape inspection method according to claim 1, wherein luminescent liquid for producing luminescence is applied to the measurement surface and the measurement surface with the luminescent liquid applied thereto and the input end face are pressed against each other, and the optical image output from the output end face is used to inspect the curved surface shape of the to-be-measured object.

8. The curved surface shape inspection method according to claim 1, wherein scattering liquid including scatterers is applied to the measurement surface and the measurement surface with the scattering liquid applied thereto and the input end face are pressed against each other, and the optical image output from the output end face is used to inspect the curved surface shape of the to-be-measured object.

9. The curved surface shape inspection method according to claim 1, wherein the position of at least one of the fiber optic block and the to-be-measured object is adjusted so that the optical image is positioned within a predetermined range of a positioning pattern provided on the output end face.

10. A fiber optic block adapted to be applied to an inspection of the curved concave surface shape of a measurement surface of a to-be-measured object and formed by bundling and integrating a plurality of optical fibers each composed of a core region and a clad region surrounding the core region, the fiber optic block comprising: an at least partially curved convex input end face composed of one end of each optical fiber, which is brought into contact with the curved concave surface shape of the measurement surface of the to-be-measured object when the inspection is carried out; and an output end face positioned on the opposite side to the input end face and adapted to output an optical image to be formed by light entering the input end face, wherein the measurement surface of the to-be-measured object is an inner surface of a groove included in the to-be-measured object, and the optical image output from the output end face of the fiber optic block includes two contact portion images corresponding to the two respective contact portions of the input end face and the measurement surface, and wherein the distance between the two contact portion images is measured to inspect the curved concave surface shape of the measurement surface of the to-be-measured object.

11. The fiber optic block according to claim 10, wherein the input end face has a semispherical shape.

12. The fiber optic block according to claim 10, further having a predetermined region including the output end face in which a light absorber for absorbing light is provided in such a manner as to surround the clad region in each optical fiber.

13. The fiber optic block according to claim 12, wherein the difference in refractive index between the core region and the clad region in each optical fiber is smaller in the predetermined region than at the input end face.

14. The fiber optic block according to claim 10, wherein an inspection pattern for inspecting the curved surface shape of the to-be-measured object is provided on the output end face.

15. The fiber optic block according to claim 10, wherein a positioning pattern for adjusting the position with respect to the to-be-measured object is provided on the output end face.

16. The fiber optic block according to claim 10, wherein the plurality of optical fibers are bundled into a hollow shape.

17. A curved surface shape inspection apparatus for inspecting the curved concave surface shape of a measurement surface of a to-be-measured object, comprising:

a fiber optic block according to claim 10; and imaging means provided in such a manner as to face the output end face of the fiber optic block and adapted to take an optical image output from the output end face.

18. The curved surface shape inspection apparatus according to claim 17, further comprising illuminating means provided in such a manner as to face the input end face and adapted to illuminate the input end face.

19. The curved surface shape inspection apparatus according to claim 17, further comprising a lens system arranged between the output end face and the imaging means and adapted to input the optical image to the imaging means.

* * * * *